US007630032B2

(12) United States Patent
Kirita et al.

(10) Patent No.: US 7,630,032 B2
(45) Date of Patent: Dec. 8, 2009

(54) LCD WITH SELECTIVE TRANSMISSION FILTER HAVING LIGHT TRANSMITTANCE OF 80% OR MORE AT WAVELENGTH REGIONS OF 440+/−20NM; 525+/−25NM AND 565+/−45NM, AND 10% OR LESS AT 470 TO 485NM AND 575 TO 595NM

(75) Inventors: Shina Kirita, Tokyo (JP); Junichi Ohsako, Tokyo (JP); Toshitaka Kawashima, Kanagawa (JP); Masayasu Kakinuma, Miyagi (JP); Shuichi Haga, Kanagawa (JP)

(73) Assignee: Sony Corporation, Tokyo (JP)

( * ) Notice: Subject to any disclaimer, the term of this patent is extended or adjusted under 35 U.S.C. 154(b) by 428 days.

(21) Appl. No.: 11/217,479

(22) Filed: Sep. 2, 2005

(65) Prior Publication Data

US 2006/0050198 A1 Mar. 9, 2006

(30) Foreign Application Priority Data

Sep. 6, 2004 (JP) ............................ P2004-258831

(51) Int. Cl.
*G02F 1/1335* (2006.01)
(52) U.S. Cl. ...................................... 349/106
(58) Field of Classification Search .......... 349/106–109
See application file for complete search history.

(56) References Cited

U.S. PATENT DOCUMENTS

| 5,721,603 A | * | 2/1998 | De Vaan et al. | ............. 349/194 |
| 2004/0085660 A1 | * | 5/2004 | Hara | ........................... 359/883 |

FOREIGN PATENT DOCUMENTS

| JP | 57-178207 | 11/1982 |
| JP | 61-103286 | 5/1986 |
| JP | 62-169192 | 7/1987 |
| JP | 07-072450 | 3/1995 |
| JP | 07-325214 | 12/1995 |
| JP | 07-325301 | 12/1995 |
| JP | 10-197859 | 7/1998 |
| JP | 2003-279988 | 7/2003 |
| JP | 2003-338212 | 11/2003 |

OTHER PUBLICATIONS

Japanese Office Action dated Jan. 24, 2008 for corresponding Japanese Application No. 2004-258831.

* cited by examiner

*Primary Examiner*—John Heyman
(74) *Attorney, Agent, or Firm*—Rader, Fishman & Grauer PLLC; Christopher M. Tobin

(57) ABSTRACT

A liquid crystal display having a wide color reproduction range is provided. A liquid crystal display includes a liquid crystal panel driven based on image signals, a light source emitting light for illuminating the liquid crystal panel, and a light selective transmission filter, which has wavelength selective transmission characteristics corresponding to spectral characteristics of the light source, selectively transmits light generated from the light source in the specific wavelength regions based on the wavelength selective transmission characteristics, and guides the transmitted light to the liquid crystal panel.

11 Claims, 10 Drawing Sheets

US 7,630,032 B2

LCD WITH SELECTIVE TRANSMISSION FILTER HAVING LIGHT TRANSMITTANCE OF 80% OR MORE AT WAVELENGTH REGIONS OF 440+/−20NM; 525+/−25NM AND 565+/−45NM, AND 10% OR LESS AT 470 TO 485NM AND 575 TO 595NM

CROSS REFERENCES TO RELATED APPLICATIONS

The present invention contains subject matter related to Japanese Patent Application JP 2004-258831 filed in the Japanese Patent Office on Sep. 6, 2005, the entire contents of which being incorporated herein by reference.

BACKGROUND OF THE INVENTION

1. Field of the Invention

The present invention relates to a liquid crystal display displaying images by utilizing a light source arranged behind a liquid crystal panel.

2. Description of the Related Art

In these years, the cathode ray tube (CRT), which has been traditionally a mainstream of displays has been replaced by the liquid crystal display, since the liquid crystal display has advantages such as low power consumption, space-saving feature, and low cost.

There are several types of liquid crystal displays when categorized by, for example, illumination methods in displaying images. As a representative example, a transmissive liquid crystal display, which displays images by utilizing a light source arranged behind a liquid crystal panel can be cited.

FIG. 1 shows a cross sectional structure of a traditional transmissive liquid crystal display. A liquid crystal display 91 mainly includes a liquid crystal panel 92, a luminaire 94 (so-called backlight) arranged behind the liquid crystal panel 92 (that is, opposite side of the observer side), and a diffusion sheet 931 arranged therebetween.

The liquid crystal panel 92 mainly includes a polarizing plate 920, a glass substrate 921, a color filter 922, a transparent electrode 923, an orientation film 924, a liquid crystal layer 925, an orientation film 926, a transparent pixel electrode 927, a glass substrate 928, and a polarizing plate 929 in this order from the observer side.

Here, in the color filter 922, color filters for respectively color-separating light emitted from the luminaire 94 into, for example, three primary colors of red (R), green (G), and blue (B) are arranged. FIG. 2 shows transmission characteristics of a general color filter. In FIG. 2, the horizontal axis represents wavelengths (nm) of incident light, and the vertical axis represents normalized transmittance. Reference symbols B9, G9, and R9 represent transmission characteristics of the color filter to blue light, green light, and red light, respectively.

For the luminaire 94, a cold-cathode fluorescent lamp 943 called CCFL is generally used as a light source. In addition, the luminaire 94 mainly includes a prism sheet 941, a diffusion sheet 942, a lamp reflector 944, a light guide plate 945, and a reflective sheet 946. FIG. 3 shows a light source spectrum of a general cold-cathode fluorescent lamp. In FIG. 3, the horizontal axis represents wavelengths (nm) of emitted light, and the vertical axis represents normalized spectral intensity. Reference symbols B10, G10, and R10 respectively represent peaks of blue light, green light, and red light. In addition, as a light source, a light emitting diode (LED) or the like may be used.

Here, light emitted from the cold-cathode fluorescent lamp 943 is reflected by the lamp reflector 944 and the reflective sheet 946, directed in the direction of the liquid crystal panel 92, spread over the whole area of the liquid crystal panel 92 by the light guide plate 945, evenly diffused by the diffusion sheets 942 and 931, oriented by the prism sheet 941, and emitted to the liquid crystal panel 92.

The light enters the liquid crystal panel 92, light with a light volume according to the voltage applied by an unshown driving circuit is transmitted to the observer side for every pixel. In general, the color filter having transmission characteristics as shown in FIG. 2 is used to perform color display.

For example, in Japanese Unexamined Patent Application Publication No. 2003-279988, a transmissive liquid crystal display capable of securing visibility to a certain degree even when used in the light environment by using a CCFL or an LED as a light source is disclosed.

SUMMARY OF THE INVENTION

However, in the traditional transmissive liquid crystal display as above, there has been a disadvantage that color reproduction ability is inferior compared to in the CRT.

That is, for example, in the case where the CCFL having the light source spectrum as shown in FIG. 3 is used as a light source, light emitted from the CCFL includes not only the red light peak R10, the green light peak G10, and the blue light peak B10, but also extra peaks 95 and 96. Therefore, when the emitted light having such a light source spectrum is color-separated by using the color filter having the transmission characteristics as shown in FIG. 2, the color filter shows the transmission characteristics with the wide wavelength band as shown in the reference symbols R9, G9, and B9 in the figure, and therefore it is difficult to selectively transmit only the specific narrow wavelength band, in which the red light peak R10, the green light peak G10, and the blue light peak B10 exist, that is, it is difficult to remove the extra peaks 95, 96 and the like. As a result, the color purity is not able to be improved, and the color reproduction range is narrow. As one of the indices showing color reproducibility in displays, NTSC (National Television System Committee) ratio can be cited. NTSC ratio shows an area of a triangle made of color coordinates belonging to the display as a ratio to an area of a triangle made by NTSC color coordinates. The NTSC ratio in a general transmissive liquid crystal display is about from 60 to 70%, which is not sufficient.

As above, in the traditional technique, in which color separation is performed for light emitted from the light source by only the color filter having transmission characteristics with a wide wavelength band, it has been difficult to obtain a liquid crystal display having a wide color reproduction range.

In view of the foregoing, in the present invention, it is desirable to provide a liquid crystal display having a wide color reproduction range.

According to an embodiment of the present invention, there is provided a first liquid crystal display including: a liquid crystal panel driven based on image signals; a light source emitting light for illuminating the liquid crystal panel; and a light selective transmission filter, which has wavelength selective transmission characteristics corresponding to spectral characteristics of the light source, selectively transmits light generated from the light source in the specific wavelength regions based on the wavelength selective transmission characteristics, and guides the transmitted light to the liquid crystal panel. In this case, it is preferable that the light source has respective intensity peaks at least in a red region, a green region, and a blue region, light transmittance in the red region, the green region, and the blue region of the light selective transmission filter is 80% or more, and the rest of the red, green, and blue region has wavelength regions whose light transmittance is 10% or less adjacent to the green region.

Here, "red region," "green region," and "blue region" respectively mean wavelength regions of red light, green light, and blue light. For example, the red region, the green region, and the blue region respectively represent a region centering on 625 nm being 90 nm wide, a region centering on 545 nm being 50 nm wide, and a region centering on 435 nm being 40 nm wide. However, the wavelength region is not limited thereto, and can be varied according to the light source.

Further, when the light selective transmission filter has a substrate and a light selective transmission layer, which is layered on the substrate, it is preferable that the light selective transmission layer has a structure in which higher refractive index layers and lower refractive index layers are alternately layered, and the bottom layer and the top layer of the light selective transmission layer are the higher refractive index layers. Further, it is preferable that the film thickness distribution of the light selective transmission layer is within ±2% to a given target value. Here, "higher refractive index layer" means a layer having a refractive index higher than of "lower refractive index layer." On the contrary, "lower refractive index layer" means a layer having a refractive index lower than of "higher refractive index layer." Further, "film thickness distribution" means film thickness variation among individuals of the light selective transmission layer, and in addition, means film thickness variation according to positions in the light selective transmission layer formed to have a certain extensity. Further, "given target value" means a target value previously set in manufacturing. The given target value includes, for example, a design value.

According to an embodiment of the present invention, there is provided a second liquid crystal display including: a liquid crystal panel driven based on image signals; a light source emitting light for illuminating the liquid crystal panel; and a light selective reflection filter, which has wavelength selective reflection characteristics corresponding to spectral characteristics of the light source, selectively reflects light generated from the light source in the specific wavelength regions based on the wavelength selective reflection characteristics, and guides the reflected light to the liquid crystal panel. In this case, it is preferable that the light source has respective intensity peaks at least in a red region, a green region, and a blue region, light reflectance in the red region, the green region, and the blue region of the light selective reflection filter is 80% or more, and the rest of the red, green and blue region has wavelength regions whose light reflectance is 10% or less adjacent to the green region.

In the first liquid crystal display according to the embodiment of the present invention, in the light selective transmission filter, only the light in the specific wavelength regions based on the wavelength transmission characteristics among the light generated from the light source is selectively transmitted and guided to the liquid crystal panel. That is, harmful wavelength light included in the light generated from the light source (that is, light in the regions other than the specific wavelength regions) is removed.

In the second liquid crystal display according to the embodiment of the present invention, in the light selective reflection filter, only the light in the specific wavelength regions based on the wavelength reflection characteristics among the light generated from the light source is selectively reflected and guided to the liquid crystal panel. That is, harmful wavelength light included in the light generated from the light source (that is, light in the regions other than the specific wavelength regions) is removed.

According to the liquid crystal display of the embodiment of the present invention, only the light in the specific wavelength regions among the light generated from the light source is selectively guided to the liquid crystal panel by using the light selective transmission filter or the light selective reflection filter having wavelength selective characteristics corresponding to spectral characteristics of the light source. Therefore, the color purity of illumination light can be improved. Thereby, the NTSC ratio can be improved, and the wide color reproduction range can be secured.

In particular, when the light selective transmission filter, in which light transmittance in the red region, the green region, and the blue region is 80% or more, and the rest of the red, green and blue region has wavelength regions whose light transmittance is 10% or less adjacent to the green region is used, the light selective transmission filter is better adapted to the light source generating light having a intensity peaks at least in one of the red region, the green region, and the blue region, and the color purity of the illumination light can be sufficiently improved.

Further, when the prism sheet is provided between the light source and the liquid crystal panel, and the light selective transmission filter is provided between the prism sheet and the liquid crystal panel, light from the light source is oriented in the direction of the liquid crystal panel by the prism sheet, and then transmitted through the light selective transmission filter. Therefore, incident angles of light to the light selective transmission filter can be small all together. In the result, variation of wavelength shift amounts in transmission light through the light selective transmission filter caused by variation of incident angles can be inhibited.

Further, in the case, in which the light selective reflection filter is formed by using a light selective reflection layer, when incident angles of light to the light selective reflection layer vary according to the incident positions, variation of wavelength shift amounts when light is reflected by the light selective reflection layer can be inhibited by forming the light selective reflection layer so that the light selective reflection layer has a film thickness according to incident angles in each incident position and so that variation of wavelength of reflected light according to the position where light is reflected is inhibited.

Other and further objects, features and advantages of the invention will appear more fully from the following description.

DETAILED DESCRIPTION OF THE PREFERRED EMBODIMENTS

Best modes for carrying out the present invention (hereinafter simply referred to as embodiment) will be hereinafter described in detail with reference to the drawings.

First Embodiment

Figure 4:
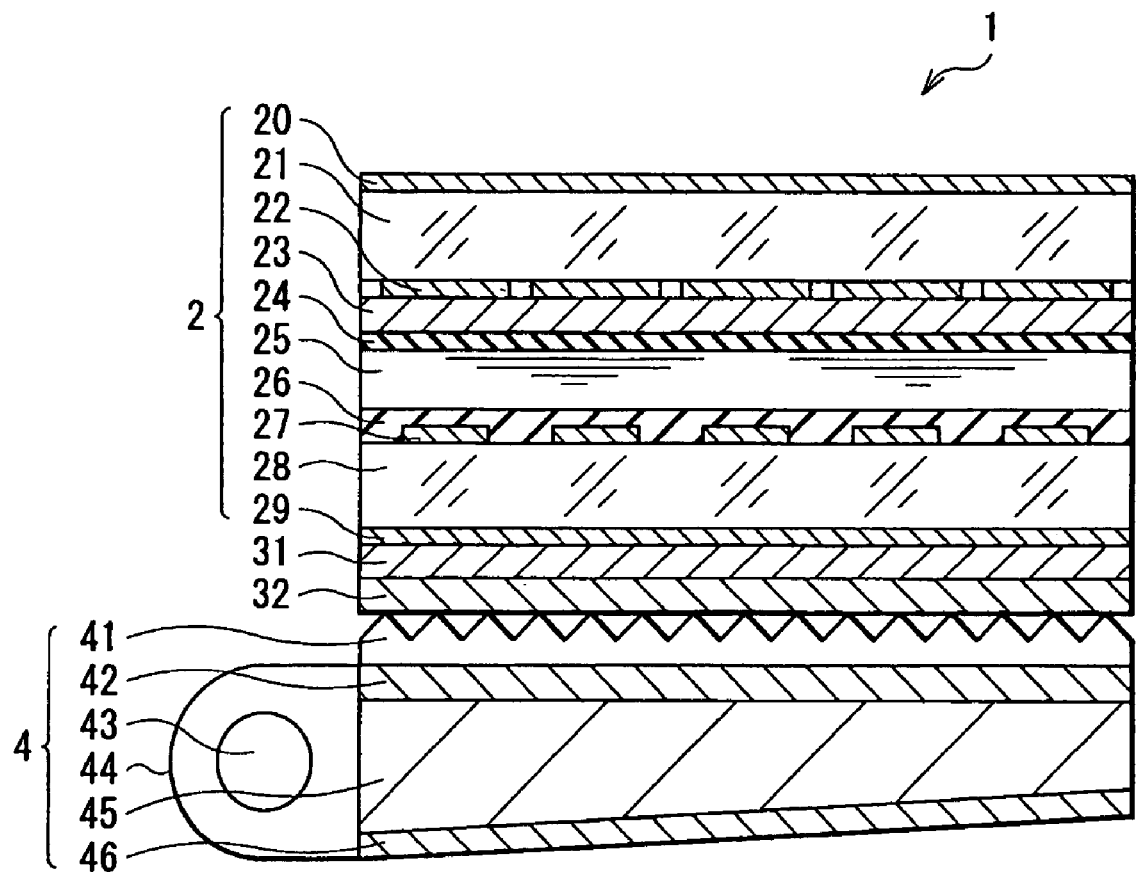
FIG. 4 is a cross section showing an example of a configuration of a liquid crystal display according to a first embodiment of the present invention.

FIG. 4 shows a cross sectional structure of a liquid crystal display according to a first embodiment of the present invention. A liquid crystal display 1 is used as a transmissive liquid crystal display and an active matrix liquid crystal display. The liquid crystal display 1 includes a liquid crystal panel 2, a luminaire 4 including a light source arranged behind the liquid crystal panel 2, and a diffusion sheet 31 and a light selective transmission filter 32 arranged between the liquid crystal panel 2 and the luminaire 4.

The liquid crystal panel 2 has a laminated structure having a liquid crystal layer 25 between a glass substrate 21 on the observer side and a glass substrate 28 on the luminaire 4 side. Specifically, the liquid crystal panel 2 has a polarizing plate 20, the glass substrate 21, a color filter 22, a transparent electrode 23, an orientation film 24, the liquid crystal layer 25, an orientation film 26, a transparent pixel electrode 27, the glass substrate 28, and a polarizing plate 29 in this order from the observer side.

The polarizing plates 20 and 29 are a kind of optical shutter, and lets through only light (polarization) in a specific oscillation direction. The polarizing plates 20 and 29 are respectively arranged so that the polarization axes are different from each other by 90°. Thereby, light emitted from the luminaire 4 is transmitted or blocked through the liquid crystal layer 25.

The glass substrates 21 and 28 are generally transparent substrates transparent to visible light. Therefore, the material thereof is not limited to glass as long as the material is transparent to visible light. Though not shown, on the glass substrate 28 on the luminaire 4 side, an active driving circuit including a TFT (Thin Film Transistor) as a driving device electrically connected to the transparent pixel electrode 27, wiring and the like is formed.

In the color filter 22, color filters for respectively color-separating light emitted from the luminaire 4 into three primary colors of red (R), green (G), and blue (B) are arranged. As described later, in the liquid crystal display 1 of this embodiment, color separation for light emitted from the luminaire 4 is performed by the light selective transmission filter 32 in addition to the color filter 22.

The transparent electrode 23 is made of, for example, ITO (Indium Tin Oxide), and functions as a common opposed electrode.

The orientation films 24 and 26 are made of, for example, a polymeric material such as polyimide, and perform orientation for the liquid crystal.

The liquid crystal layer 25 is made of, for example, TN (Twisted Nematic) mode liquid crystal or STN (Super Twisted Nematic) mode liquid crystal. The liquid crystal layer 25 has a function to transmit or block light emitted from the luminaire 4 for every pixel by the voltage applied from an unshown driving circuit.

The transparent pixel electrode 27 is made of, for example, ITO, and functions as an electrode for every pixel.

The luminaire 4 has a laminated structure in which a prism sheet 41, a diffusion sheet 42, a light guide plate 45, and a reflective sheet 46 are layered, a cold-cathode fluorescent lamp 43 as a light source arranged on the side face of the laminated structure, and a lamp-reflector 44 arranged around the cold-cathode fluorescent lamp 43. Part of the lamp reflector 44 is opened toward the foregoing laminated structure. As above, the luminaire 4 has a so-called edge light type structure.

Figure 3:
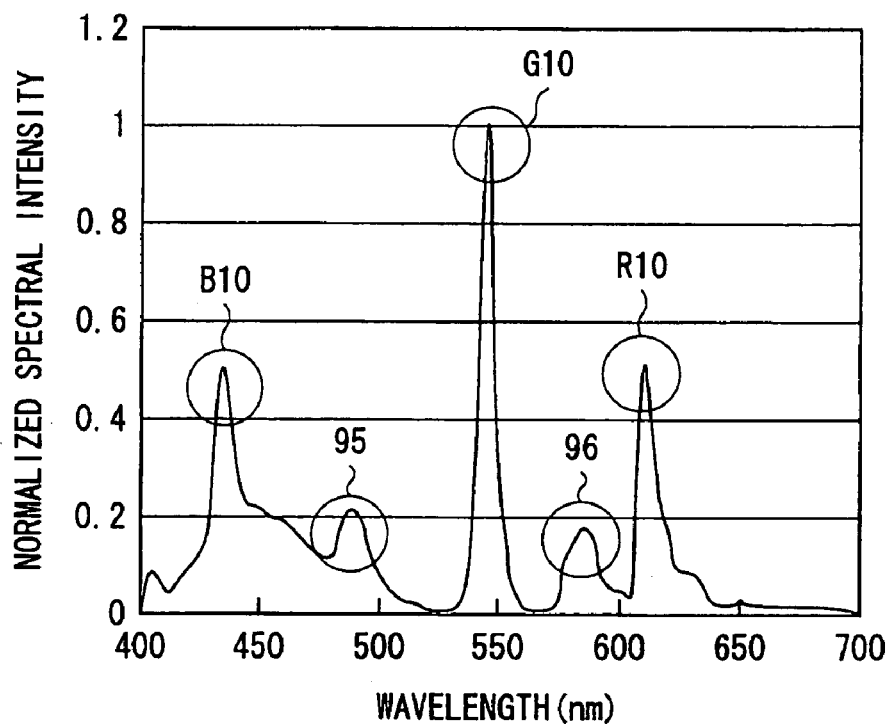
FIG. 3 is a characteristics view showing a light source spectrum of a general cold-cathode fluorescent lamp.

The cold-cathode fluorescent lamp 43 is a so-called CCFL, and a kind of fluorescent lamp. As shown in FIG. 3 described above, the light source spectrum of a general cold-cathode fluorescent lamp has a wide range of wavelengths from 400 to 700 nm. In the example shown in the figure, specifically, the blue light peak B10 (=435 nm), the green light peak G10 (=545 nm), and the red light peak R10 (=625 nm) exist, in addition, the extra peak 95 (=490 nm) and the extra peak 96 (580 nm) exist.

The lamp reflector 44 has a function to reflect part of light emitted from the cold-cathode fluorescent lamp 43 in the direction of the light guide plate 45. Thereby, light emitted from the cold-cathode fluorescent lamp 43 can be effectively utilized.

The light guide plate 45 has a function to totally reflect and concurrently propagate light emitted from the cold-cathode fluorescent lamp 43, and to spread the light over the whole area of the liquid crystal panel 2. Thereby, light emitted from the cold-cathode fluorescent lamp 43 can be flat light.

The reflective sheet 46 has a function to reflect light to be leaked from the light guide plate 45 toward inside of the light guide plate 45. Thereby, as in the foregoing lamp reflector 44, light emitted from the cold-cathode fluorescent lamp 43 can be effectively utilized.

The diffusion sheet 42 has a function to diffuse flat light spread over the whole area of the liquid crystal panel 2 by the light guide plate 45 and to reduce brightness unevenness. Thereby, the whole area of the liquid crystal panel 2 is irradiated with light with uniform brightness.

The prism sheet 41 has a function to orient light whose brightness is uniformalized on the whole area of the liquid crystal panel 2 by the diffusion sheet 42 all together in the direction of the liquid crystal panel 2. Therefore, in the case where the light selective transmission filter 32 is provided between the prism sheet 41 and the liquid crystal panel 2 as in the liquid crystal display 1 of this embodiment, light emitted from the cold-cathode fluorescent lamp 43 is oriented in the direction of the liquid crystal panel 2 by the prism sheet 41, and then is transmitted through the light selective transmission filter 32. Therefore, variation of wavelength shift amounts in light transmitted through the light selective transmission filter 32 caused by variation of incident angles can be inhibited.

A diffusion sheet 31 has a function to diffuse light emitted from the luminaire 4 and selectively transmitted through the after-mentioned light selective transmission filter and to reduce brightness unevenness as the diffusion sheet 42.

Figure 6:
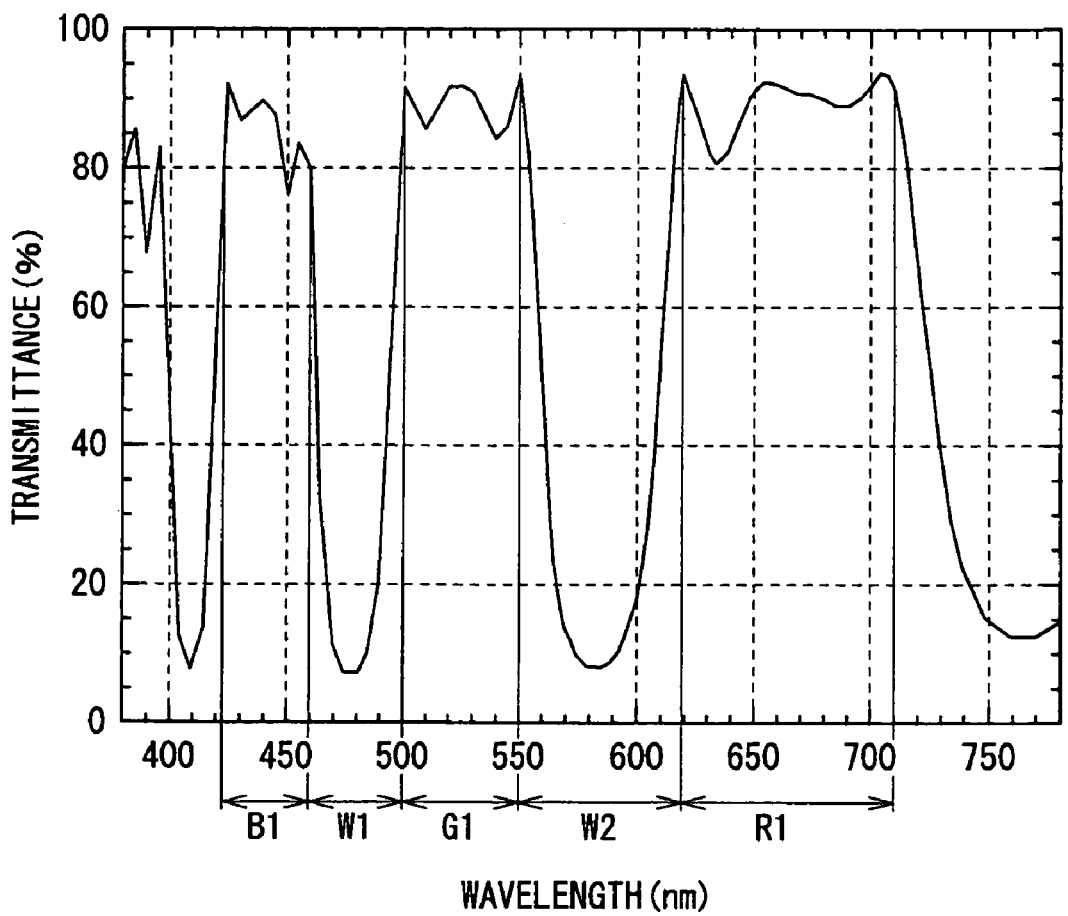
FIG. 6 is a characteristics view showing transmission characteristics of the light selective transmission filter shown in FIG. 4.

As shown in after-mentioned FIG. 6, for example, the light selective transmission filter 32 has wavelength selective transmission characteristics corresponding to spectral characteristics of the cold-cathode fluorescent lamp 43 as a light source (for example, FIG. 3). In FIG. 6, the horizontal axis represents wavelengths (nm) of incident light, and the vertical axis represents transmittance (%). Reference symbols B1, G1, and R1 represent a blue region (440±20 nm), a green region (525±25 nm), and a red region (665±45 nm), respectively. As above, the light selective transmission filter 32 has a function to selectively transmit light emitted from the cold-cathode fluorescent lamp 43 (for example, three primary color regions including the red light peak R10, the green light peak G10, and the blue light peak B10 in FIG. 3) in the specific wavelength regions based on the wavelength selective transmission characteristics and to guide the transmitted light to the liquid crystal panel 2. For the details of the wavelength selective transmission characteristics of the light selective transmission filter 32, descriptions will be given later. By providing the light selective transmission filter 32, the color purity of illumination light can be improved. In the result, as described later, the NTSC ratio can be improved, and the color reproduction range can be expanded.

Figure 5:
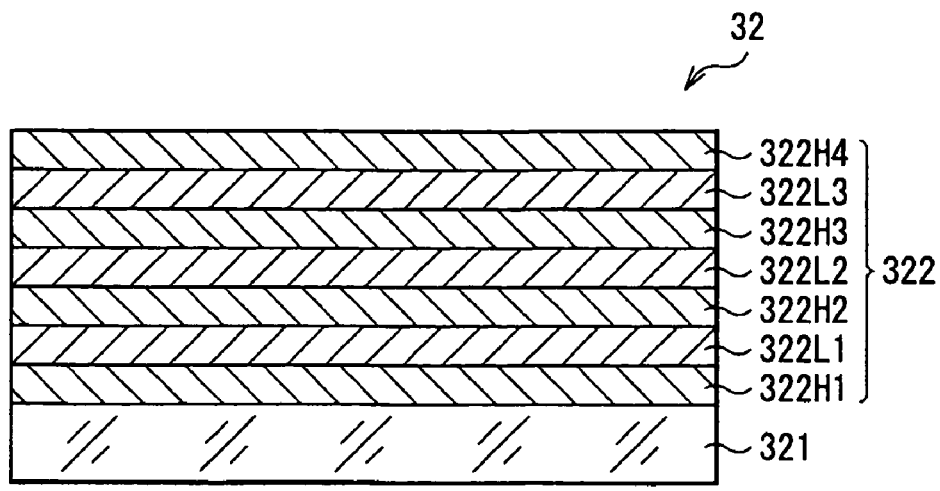
FIG. 5 is a cross section showing an example of a configuration of a light selective transmission filter shown in FIG. 4.

FIG. 5 shows a cross sectional structure of the light selective transmission filter 32. In the light selective transmission filter 32, a light selective transmission layer 322 is formed on a transparent substrate 321. Further, the light selective transmission layer 322 is composed of an optical thin film, in which higher refractive index layers 322H1 to 322H4 and lower refractive index layers 322L1 to 322L3 are alternately layered. The bottom layer and the top layer of the light selective transmission layer 322 are made of the higher refractive index layers (in FIG. 5, the higher refractive index layers 322H1 and 322H4).

The transparent substrate 321 is a section becoming a support of the light selective transmission layer 322. For example, the transparent substrate 321 is made of a polymeric material containing polycarbonate (PC), polyethylene telephthalate (PET), polyethylene naphthalate (PEN), polyether sulfone (PES), or polyolefin (PO).

The light selective transmission layer 322 is a section playing a core role of the light selective transmission filter 32. As described above, the light selective transmission layer 322 has a function to selectively transmit light emitted from the cold-cathode fluorescent lamp 43 in the specific wavelength region based on the wavelength selective transmission characteristics and to guide the transmitted light to the liquid crystal panel 2.

As described later, the light selective transmission layer 322 can be formed by dry process or wet process. In the case of the dry process, the foregoing higher refractive index layers 322H1 to 322H4 include layers made of, for example, a titanium oxide such as $TiO_2$ (refractive index: 2.38), a niobium oxide such as $Nb_2O_5$ (refractive index: 2.28), or a tantalum oxide such as $Ta_2O_5$ (refractive index: 2.10), and the foregoing lower refractive index layers 322L1 to 322L3 include layers made of, for example, a silicon oxide such as $SiO_2$ (refractive index: 1.46) or magnesium fluoride such as $MgF_2$ (refractive index: 1.38). Meanwhile, in the case of the wet process, the higher refractive index layers 322H1 to 322H4 and the lower refractive index layers 322L1 to 322L3 are made of a solvent material or a non-solvent material such as a thermosetting resin and a photocurable resin (for example, ultraviolet curable resin). In this case, specifically, as a higher refractive index layer, for example, Opster of JSR (JN7102, refractive index: 1.68) can be used, and as a lower refractive index layer, for example, Opster of JSR (JN7215, refractive index: 1.41) can be used.

The structure of the light selective transmission layer 322 is not limited to the seven-layer structure as shown in FIG. 5. It is enough that the light selective transmission layer 322 has an odd-numbered layer structure such as a five-layer structure and a nine-layer structure, and the bottom layer and the top layer are the higher refractive index layers as described above.

An example of the whole structure of the light selective transmission filter 32 and film thicknesses of the optical multilayer film is as follows. The transparent substrate 321 is made of PET, the higher refractive index layer is made of $Nb_2O_5$ (referred to as H), and the lower refractive index layer is made of $SiO_2$ (referred to as L). In the light selective transmission filter 32, PET/H (film thickness: 457 nm)/L (film thickness 94 nm)/H (film thickness: 457 nm)/L (film thickness 94 nm)/H (film thickness: 457 nm)/L (film thickness 94 nm)/H (film thickness: 457 nm) are layered in this order from the transparent substrate 321 side.

Next, descriptions will be given of an example of a method of forming the light selective transmission filter 32 having the foregoing structure. As described above, since the light selective transmission filter 32 can be formed by the dry process or the wet process, descriptions will be given of both the dry process and the wet process.

First, the transparent substrate 321 made of the foregoing polymeric material is prepared. Next, by sputtering method or the like in the case of the dry process, or by spin coating method, dip coating method or the like in the case of the wet process, the higher refractive index layers 322H and the lower refractive index layers 322L respectively made of the foregoing material are alternately layered on the transparent substrate 321. Then, as described above, the bottom layer and the top layer are formed from the higher refractive index layers. Consequently, the light selective transmission filter 32 is formed.

By arranging the light selective transmission filter 32 formed as above between the luminaire 4 and the diffusion sheet 31 shown in FIG. 4, the liquid crystal display 1 of this embodiment can be manufactured.

Next, basic operations when images are displayed in the liquid crystal display 1 manufactured as above will be hereinafter described.

First, in the luminaire 4, light emitted from the cold-cathode florescent lamp 43 is reflected by the lamp reflector 44 and the reflective sheet 46, directed in the direction of the liquid crystal panel 2, spread over the whole area of the liquid crystal panel 2 by the light guide plate 45, evenly diffused by the diffusion sheet 42, oriented by the prism sheet 41, and emitted.

Next, among the light emitted from the luminaire 4, light in the specific wavelength regions based on the wavelength selective transmission characteristics is selectively transmitted and emitted to the liquid crystal panel 2 by the light selective transmission filter 32.

The selectively transmitted light enters the liquid crystal panel 2, light having a light volume based on the voltage applied for every pixel between the transparent pixel electrode 27 and the transparent electrode 23 as an opposed electrode is transmitted and color-separated by using the color filter 22, and thereby color images are displayed.

Figure 1:
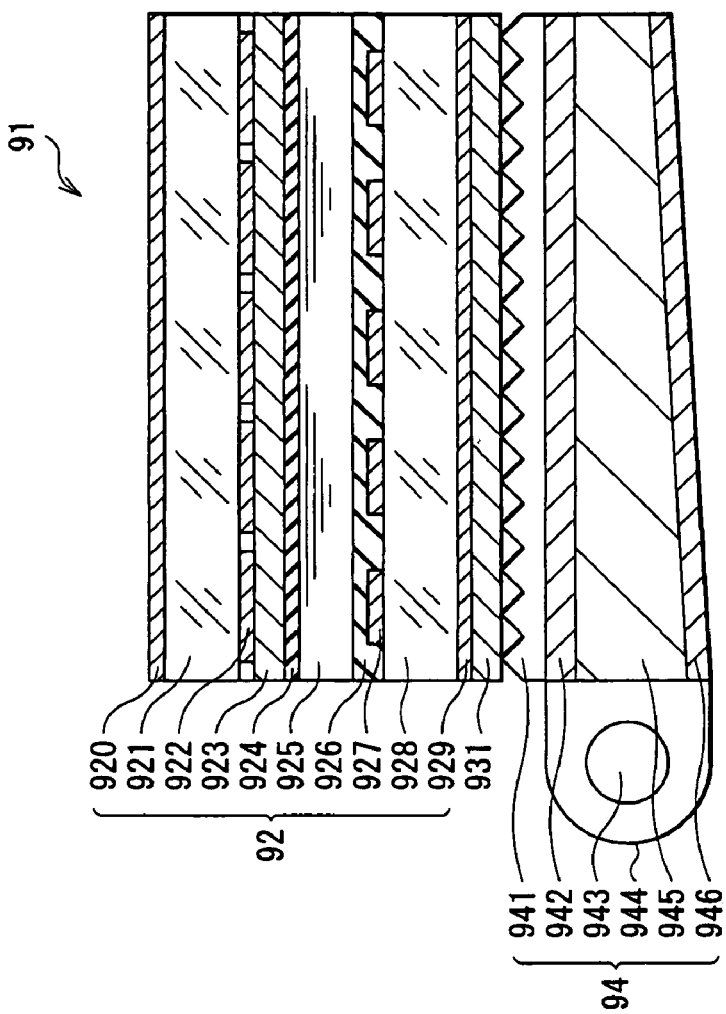
FIG. 1 is a cross section showing an example of a configuration of a traditional transmissive liquid crystal display.

Next, optical characteristics of the liquid crystal display 1 of this embodiment will be described by comparison with of the traditional liquid crystal display 91 shown in FIG. 1.

Here, as an example of the light selective transmission filter 32, as described above, the light selective transmission filter 32 having seven-layer structure in which the transparent substrate 321 is made of PET, the higher refractive index layer is made of $Nb_2O_5$ (referred to as H), and the lower refractive index layer is made of $SiO_2$ (referred to as L), and PET/H (film thickness: 457 nm)/L (film thickness 94 nm)/H (film thickness: 457 nm)/L (film thickness 94 nm)/H (film thickness: 457 nm)/L (film thickness 94 nm)/H (film thickness: 457 nm) are layered in this order from the transparent substrate 321 side is used.

FIG. 6 shows transmission characteristics of the light selective transmission filter 32.

As shown in the figure, the light selective transmission filter 32 shows wavelength selective transmission characteristics to selectively transmit light in the specific wavelength regions corresponding to the light source spectrum of the cold-cathode fluorescent lamp 43 (for example, three primary color regions including the red light peak R10, the green light peak G10, and the blue light peak B10 in FIG. 3). Specifically, the specific wavelength regions are, for example, the red region R1, the green region G1, and the red region R1 in the figure. The transmittance in such regions is 80% or more. The rest of the red, green and blue region has wavelength regions having transmittance of 10% or less (specifically, wavelength regions of about from 470 to 485 nm and about from 575 to 595 nm) adjacent to the green region (specifically, wavelength regions W1 and W2). Therefore, different from the general color filter shown in FIG. 2, transmission characteristics of a narrow wavelength band are shown. Consequently, when light emitted from the cold-cathode fluorescent lamp 43 is previously filtered by using the light selective transmission filter 32 in addition to the color filter, the color purity of illumination light of the liquid crystal panel 2 can be improved.

Figure 2:
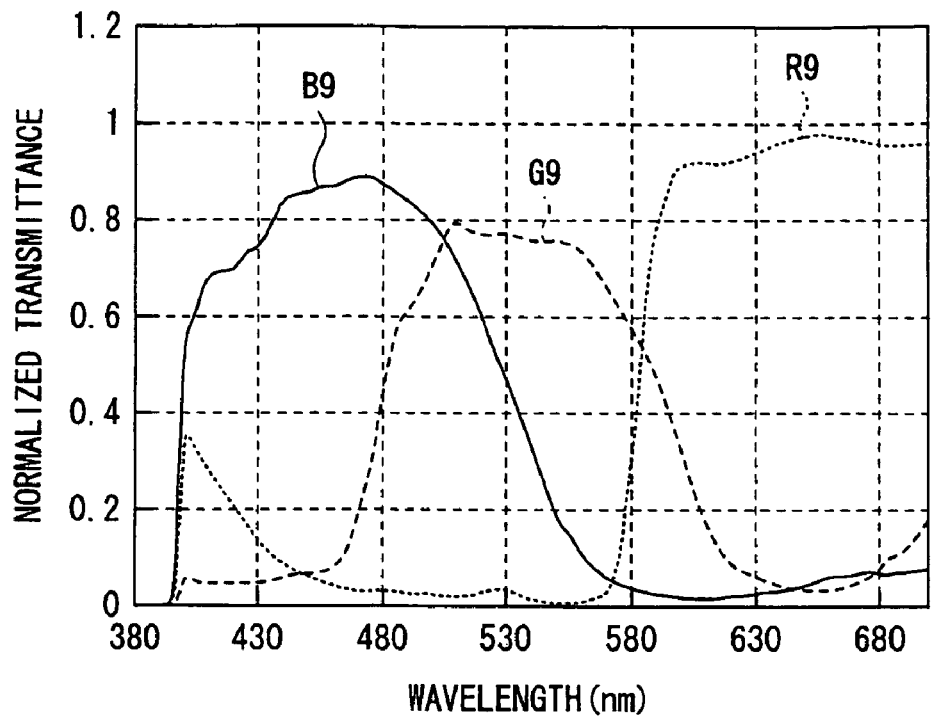
FIG. 2 is a characteristics view showing transmission characteristics of a general color filter.
Figure 7:
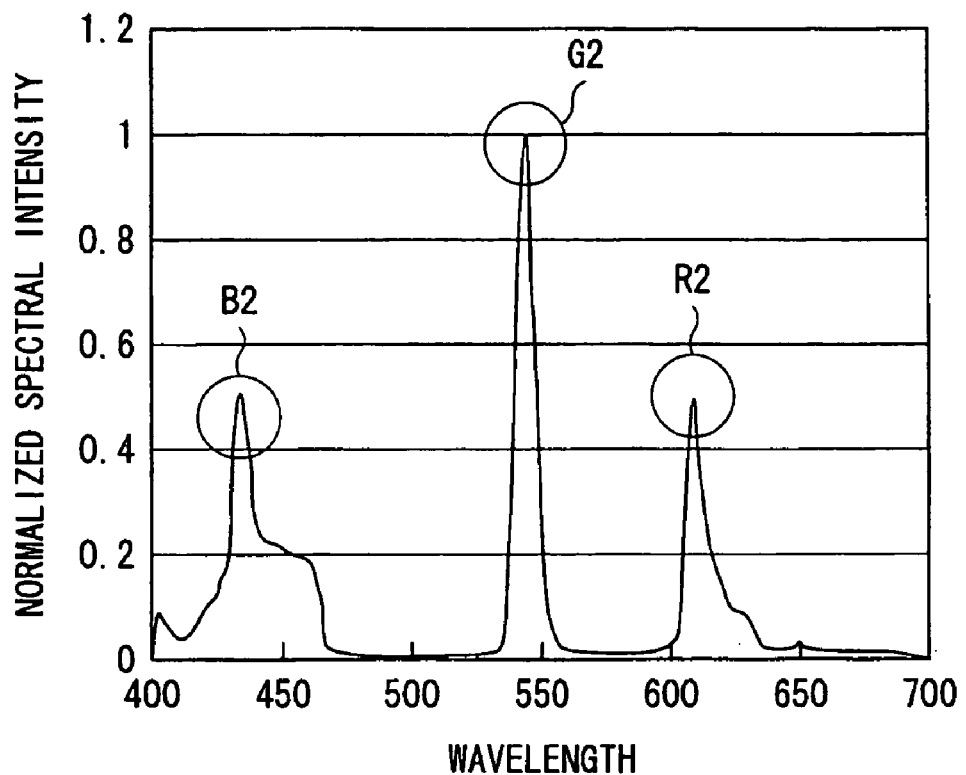
FIG. 7 is a characteristics view showing spectral intensity of illumination light transmitted through the light selective transmission filter shown in FIG. 4.

When light emitted from a general cold-cathode fluorescent lamp having the light source spectrum as shown in FIG. 3 was actually transmitted through the light selective transmission filter 32 in addition to the color filter 22 having the general transmission characteristics as shown in FIG. 2 (that is, configuration of the liquid crystal display 1 of FIG. 4), it was found that the illumination light spectrum as shown in FIG. 7 was obtained. That is, since the extra peaks 95 and 96 in FIG. 3 were removed, only a red light peak R2, a green light peak G2, and a blue light peak B2 in FIG. 7 existed, and intensity of light other than light in the specific wavelength regions became very small. As above, it was found that the color purity of illumination light could be actually improved by using the light selective transmission filter 32 having wavelength selective transmission characteristics, which adapt to light source spectral characteristics of the cold-cathode fluorescent lamp 43.

Figure 8:
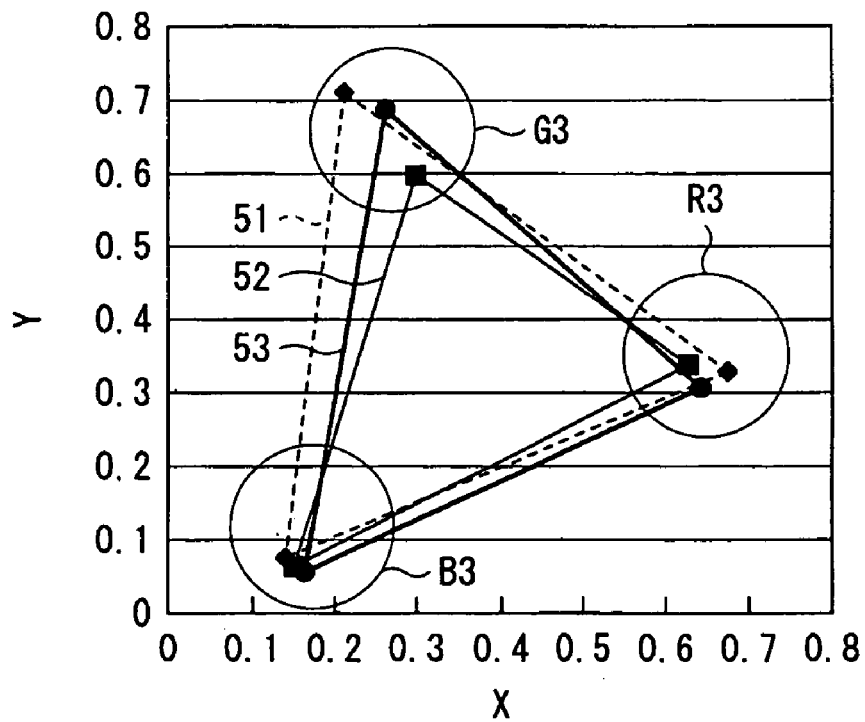
FIG. 8 is a characteristics view showing a color reproduction range of the liquid crystal display according to the first embodiment.

FIG. 8 shows a color reproduction range of the liquid crystal display 1 including the light selective transmission filter 32 having such wavelength selective transmission characteristics, which is shown in NTSC color space. In the figure, reference symbol 51 represents the color reproduction range by NTSC color coordinates, reference symbol 52 represents the color reproduction range by the traditional liquid crystal display 91 as shown in FIG. 1 (that is, the display performing color separation for light emitted from the cold-cathode fluorescent lamp 943 only by the color filter 922), reference symbol 53 represents the color reproduction range by the liquid crystal display 1 of this embodiment (that is, the display performing color separation for light emitted from the cold-cathode fluorescent lamp 43 by the light selective transmission filter 32 in addition to the color filter 22), and reference symbols R3, G3, and B3 represent regions of color coordinates of red light, green light, and blue light, respectively.

As above, it was found that in the color reproduction range 53 by the liquid crystal display of this embodiment, the color reproduction range was expanded compared to the color reproduction range 52 by the traditional liquid crystal display, and in particular, significant effects could be obtained in the green light region G3. Further, when the NTSC ratios were compared, the NTSC ratio in the traditional liquid crystal display was 70.7%, meanwhile the NTSC ratio in the liquid crystal display of this embodiment was 88.0%, which was a very high value. As above, by using the light selective transmission filter 32 adapted to the light source spectral characteristics of the cold-cathode fluorescent lamp 43, the NTSC ratio can be improved and the color reproduction range can be expanded.

Figure 9:
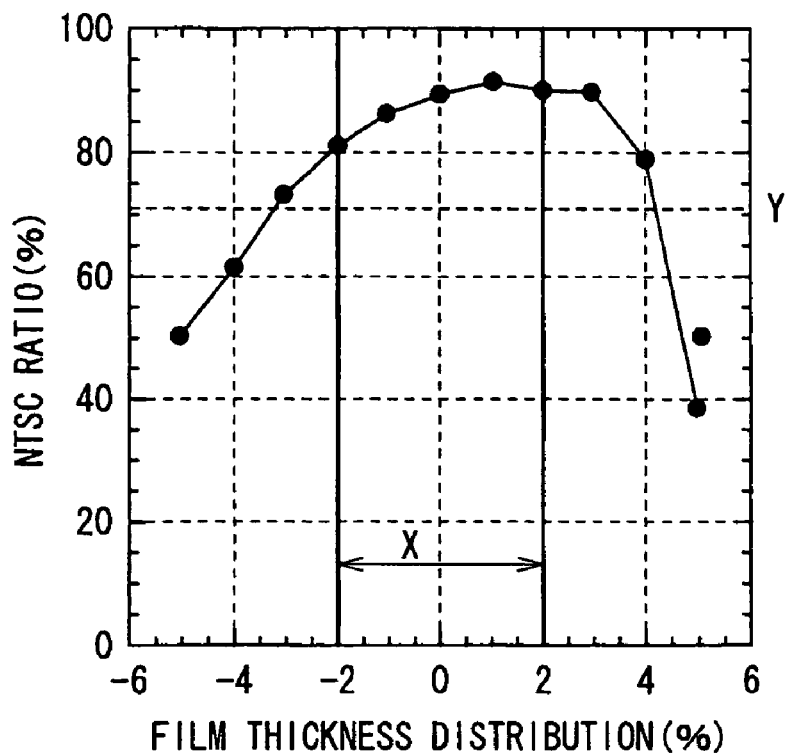
FIG. 9 is a characteristics view showing a relation between a film thickness distribution and NTSC ratios of a light selective transmission layer.

As shown in FIG. 9, when a relation between the film thickness distribution of the light selective transmission layer 322 (film thickness of the whole optical multilayer film) and NTSC ratios was examined, it was found that as long as the film thickness distribution was within ±2% to a given target value X (point where the film thickness distribution is 0%), apparently high NTSC ratios (about 80% or more) were shown compared to the NTSC ratio Y (70.7%) of the traditional liquid crystal display. It is not particularly difficult to set the film thickness distribution of the light selective transmission layer 322 within ±2% to a given target value in mass production. Therefore, by using such an optical selective transmissive filter 32, the NTSC ratio of the liquid crystal display can be surely improved at a high yield ratio in mass production as well.

As above, in this embodiment, the light selective transmission filter 32 having wavelength selective transmission characteristics corresponding to spectral characteristics of the light source is provided between the cold-cathode fluorescent lamp 43 as a light source and the liquid crystal panel 2, light emitted from the cold-cathode fluorescent lamp 43 in the specific wavelength regions based on the wavelength selective transmission characteristics is selectively transmitted and guided to the liquid crystal panel 2. Therefore, the color purity of illumination light of the liquid crystal panel 2 can be improved. In the result, the NTSC ratio can be improved and the color reproduction range can be expanded.

In particular, the light selective transmission filter 32 in which transmittance in the red region R1 (665±45 nm), the green region G1 (525±25 nm), and the blue region B1 (440±20 nm) is 80% or more, and the rest of the red, green and blue region has wavelength regions whose light transmittance is 10% or less adjacent to the green region G1 is used. Therefore, the light selective transmission filter 32 is better adapted to the cold-cathode fluorescent lamp 43 generating light having intensity peaks in such red region R1, green region G1, and blue region B1 (for example, the red light peak R10, the green light peak G10, and the blue light peak B10), and color purity of illumination light can be sufficiently improved.

Further, the light selective transmission filter 32 is provided between the prism sheet 41 and the liquid crystal panel 2. Therefore, variation of wavelength shift amounts in the light transmitted through the light selective transmission filter 32 caused by variation of incident angles can be inhibited. In the result, the color purity of illumination light can be further improved.

Further, the light guide plate 45 is provided in the luminaire 4 to obtain the edge light type structure. Therefore, the whole area of the liquid crystal panel 2 can be irradiated with light emitted from the single light source (cold-cathode fluorescent lamp 43), and the liquid crystal display 1 can be thinned.

Further, when the film thickness distribution of the light selective transmission filter 32 is within ±2% to a given target value, the NTSC ratio of the liquid crystal display can be surely improved. Therefore, the liquid crystal display can be easily formed at a high yield ratio in mass production.

In the liquid crystal display 1 of this embodiment, the case, in which the light selective transmission filter 32 is provided between the prism sheet 41 and the liquid crystal panel 2 has been described. However, arrangement of the light selective transmission filter 32 is not limited thereto. The light selective transmission filter 32 is preferably arranged between the cold-cathode fluorescent lamp 43 as a light source and the liquid crystal panel 2.

Descriptions will be given of Modification 1 of the first embodiment.

[Modification 1]

In this modification, the light selective transmission filter is arranged on the surface of the cold-cathode fluorescent lamp 43 as a light source in the first embodiment.

Figure 10:
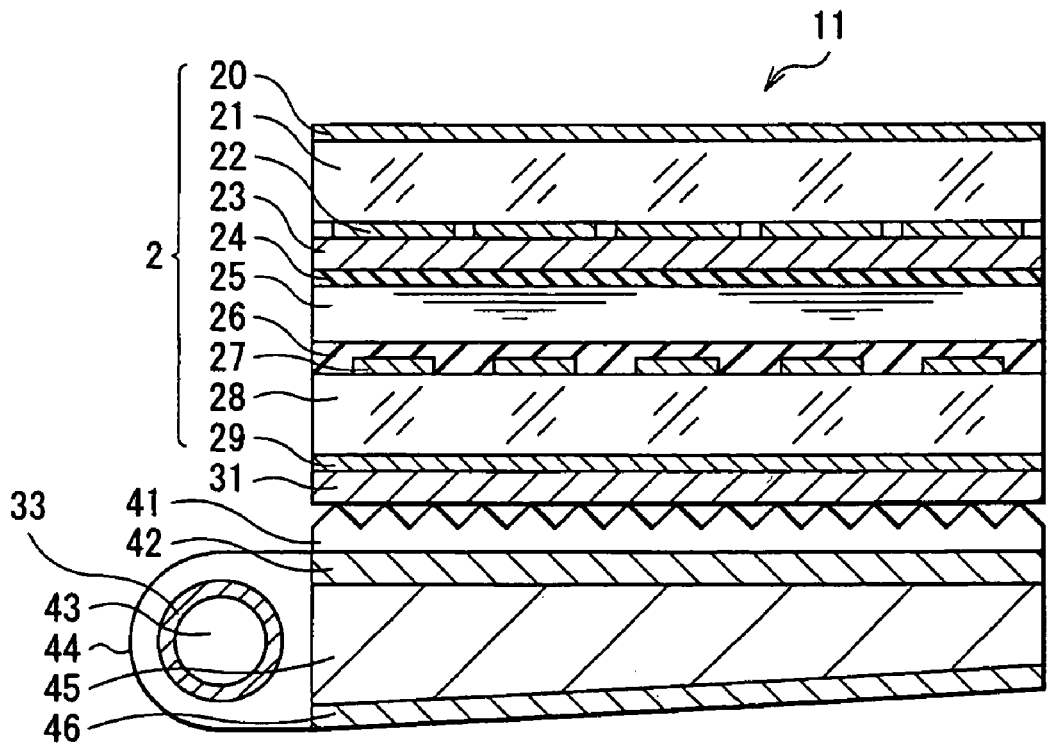
FIG. 10 is a cross section showing an example of a configuration of a liquid crystal display according to a first modification.

FIG. 10 shows a cross sectional structure of a liquid crystal display according to this modification. A liquid crystal display 11 of this modification includes the liquid crystal panel 2, the luminaire 4 arranged behind the liquid crystal panel 2, and the diffusion sheet 31 arranged therebetween. The point different from the liquid crystal display 1 in the first embodiment is that a light selective transmission filter 33 is arranged on the surface of the cold-cathode fluorescent lamp 43 as a light source as described above. The light selective transmission filter 33 is not always directly arranged on the surface of the cold-cathode fluorescent lamp 43, but other layer may be sandwiched inbetween. Other respective components are similar to of the first embodiment, and therefore descriptions thereof are omitted.

When the light selective transmission filter 33 is arranged on the surface of the cold-cathode fluorescent lamp 43 as a light source as above, light emitted from the cold-cathode fluorescent lamp 43 in the specific wavelength regions can be selectively transmitted and guided to the liquid crystal panel 2, and effects similar to of the first embodiment can be obtained as well.

As a method of arranging the light selective transmission filter 33 of this modification on the surface of the cold-cathode fluorescent lamp 43, a method of directly forming the light selective transmission layer 322 by the foregoing dry process or the foregoing wet process, or a method of bonding the light selective transmission filter 32 formed by the method described in the first embodiment on the surface of the cold-cathode fluorescent lamp 43 by, for example, an adhesive tape.

Next, descriptions will be given of Modification 2 of the first embodiment.

[Modification 2]

This modification relates to a so-called underlay luminaire, in which the cold-cathode fluorescent lamp 43 as a light source is arranged directly under the liquid crystal panel 2 in the first embodiment.

Figure 11:
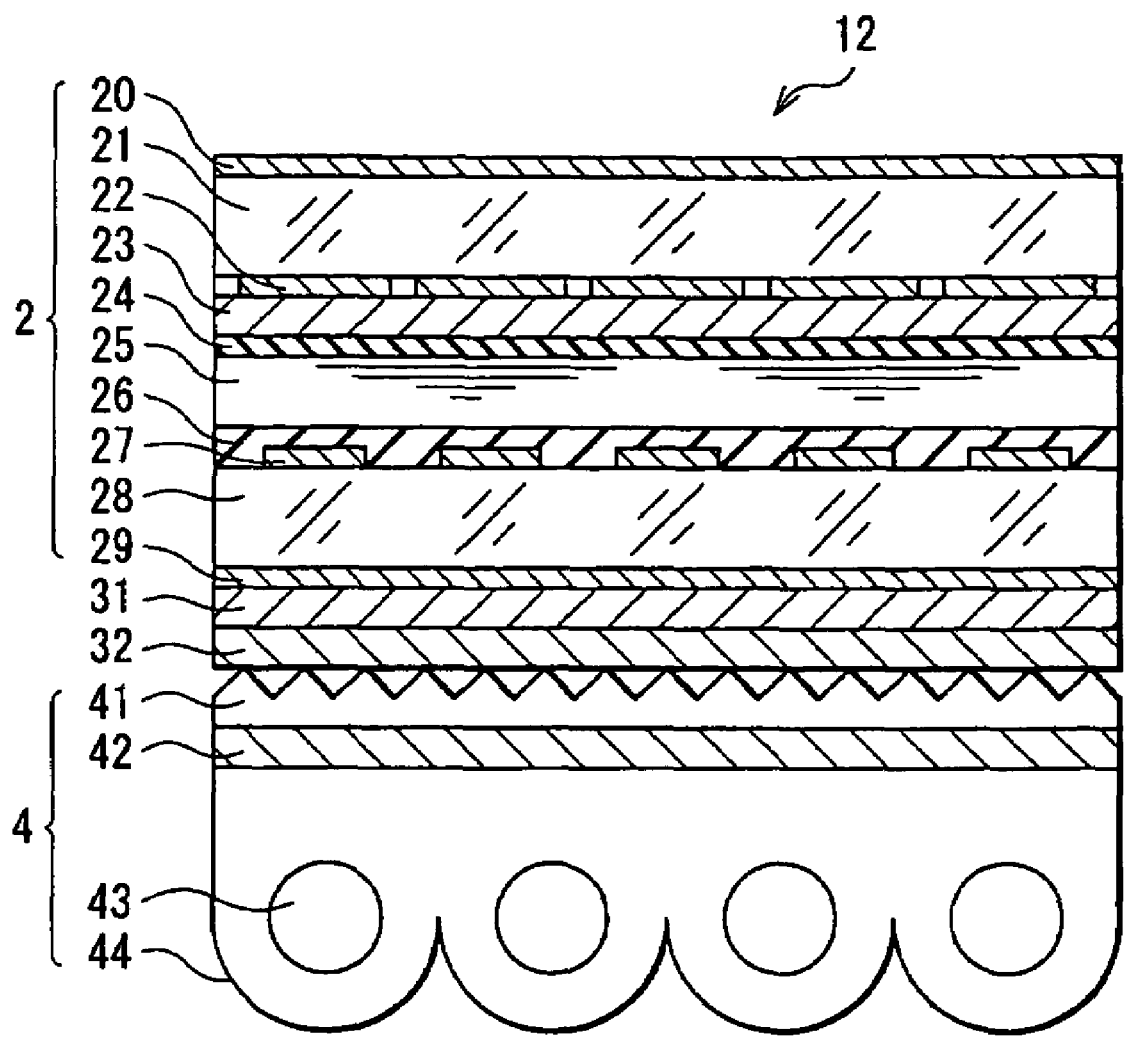
FIG. 11 is a cross section showing an example of a configuration of a liquid crystal display according to a second modification.

FIG. 11 shows a cross sectional structure of a liquid crystal display according to this modification. A liquid crystal display 12 of this modification includes the liquid crystal panel 2, the luminaire 4 arranged behind the liquid crystal panel 2, the diffusion sheet 31 and the light selective transmission filter 32, which are arranged between the liquid crystal panel 2 and the luminaire 4. The point different from the liquid crystal display 1 in the first embodiment is that the luminaire 4 has a underlay configuration. That is, the luminaire 4 has a structure in which a plurality of cold-cathode fluorescent lamps 43 as a light source (in this modification, the case, in which four cold-cathode fluorescent lamps 43 are arranged is shown) and the lamp reflectors 44, which are arranged around the plurality of cold-cathode fluorescent lamps 43, are arranged directly under a multilayer film having a laminated structure including the prism sheet 41 and the diffusion sheet 42 in this order from the observer side. Since the cold-cathode fluorescent lamp 43 is arranged directly under the liquid crystal panel 2, the light guide plate 45 is not necessary, and the plurality of cold-cathode fluorescent lamps 43 can be arranged. Other components are similar to of the first embodiment, and therefore descriptions thereof are omitted.

By making the luminaire 4 having the underlay structure as above, the light guide plate 45 is not necessary. As a result, in addition to the effects in the first embodiment, the structure can be simplified, and the number of parts can be decreased. Therefore, the cost can be thereby reduced. Further, since the plurality of cold-cathode fluorescent lamps 43 can be arranged, brightness of the liquid crystal display 12 can be improved.

Figure 12:
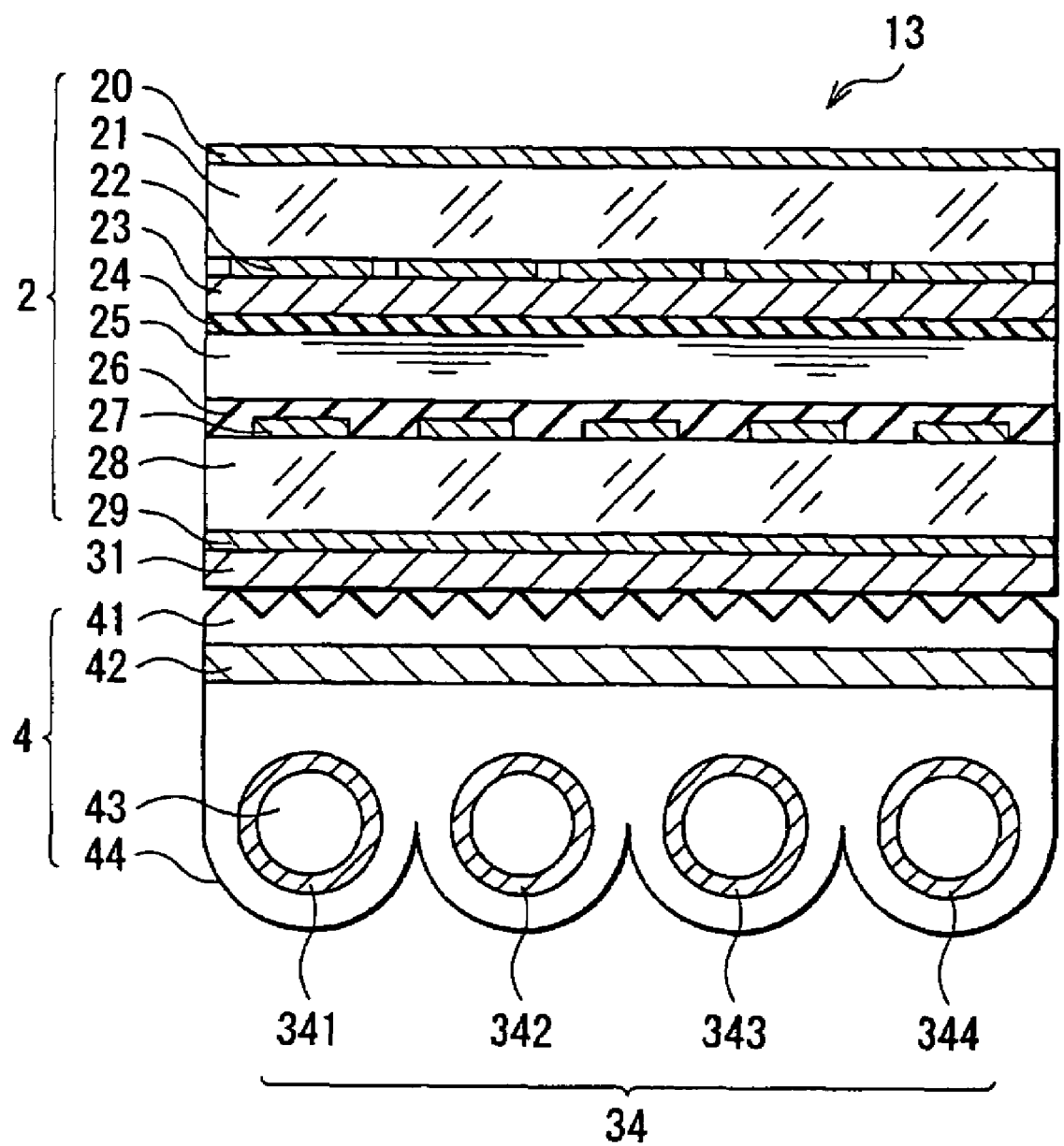
FIG. 12 is a cross section-showing another example of the configuration of the liquid crystal display according to the second modification.

As shown in FIG. 12, in the underlay luminaire 4, as in the foregoing modification 1, it is also possible to arrange a light selective transmission filter 34 including components indicated by reference symbols 341 to 344 on the surface of the respective cold-cathode fluorescent lamp 43. In this case, the effects similar to of FIG 11 can be obtained.

Second Embodiment

Next, descriptions will be given of a second embodiment of the present invention.

In the foregoing first embodiment, the liquid crystal display, in which the color reproduction range is expanded by providing the light selective transmission filter has been described. In this embodiment, a liquid crystal display capable of expanding the color reproduction range by providing a light selective reflection filter will be described.

Figure 13:
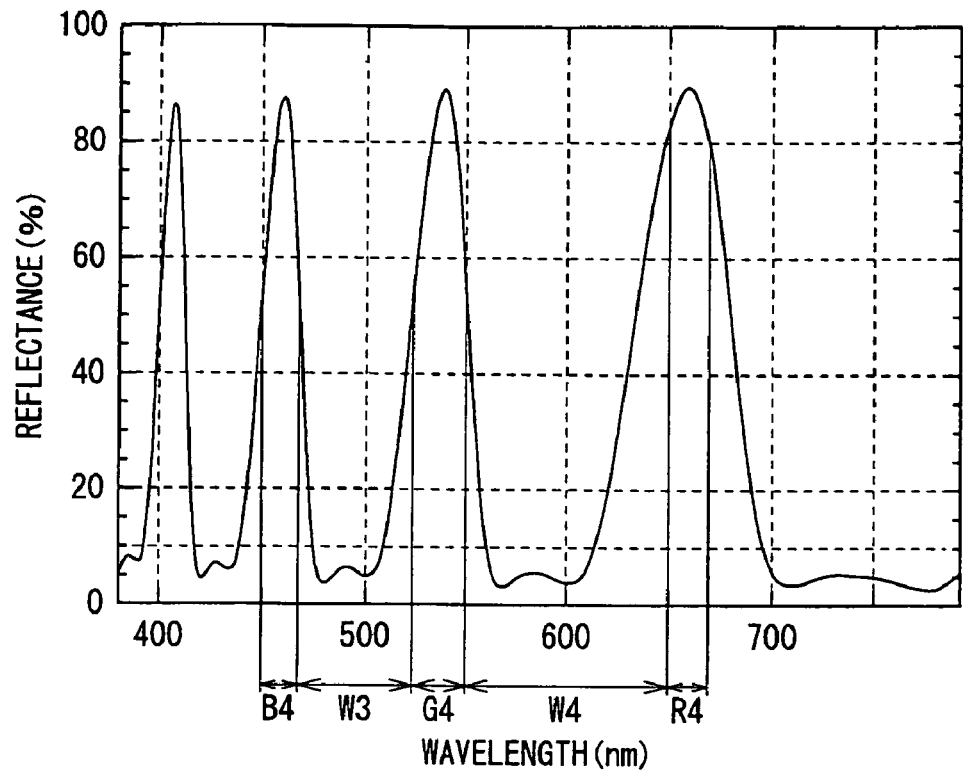
FIG. 13 is a cross section showing an example of a configuration of a liquid crystal display according to a second embodiment of the present invention.

FIG. 13 shows a cross sectional structure of the liquid crystal display according to the second embodiment of the present invention. A liquid crystal display 6 of this embodiment includes the liquid crystal panel 2, the luminaire 4 arranged behind the liquid crystal panel 2, and the diffusion sheet 31 arranged therebetween. The point different from the liquid crystal display 1 in the first embodiment is that, as described above, instead of the light selective transmission filter, a light selective reflection filter 36 is provided between a slope K of the light guide plate 45, that is, the light guide plate 45 and the reflective sheet 46. In other words, the luminaire 4 has a laminated structure including the prism sheet 41, the diffusion sheet 42, the light guide plate 45, the light selective reflection filter 36, and the reflective sheet 46 from the observer side, the cold-cathode fluorescent lamp 43 as a light source arranged on the side face of the laminated structure, and the lamp reflector 44 arranged around the cold-cathode fluorescent lamp 43. Part of the lamp reflector 44 is opened toward the foregoing laminated structure as in the first embodiment. The light selective reflection filter 36 also has a function as a reflective sheet, and therefore the reflective sheet 46 is not necessarily provided. Further, other components are similar to of the first embodiment, and therefore descriptions thereof are omitted.

Figure 15:
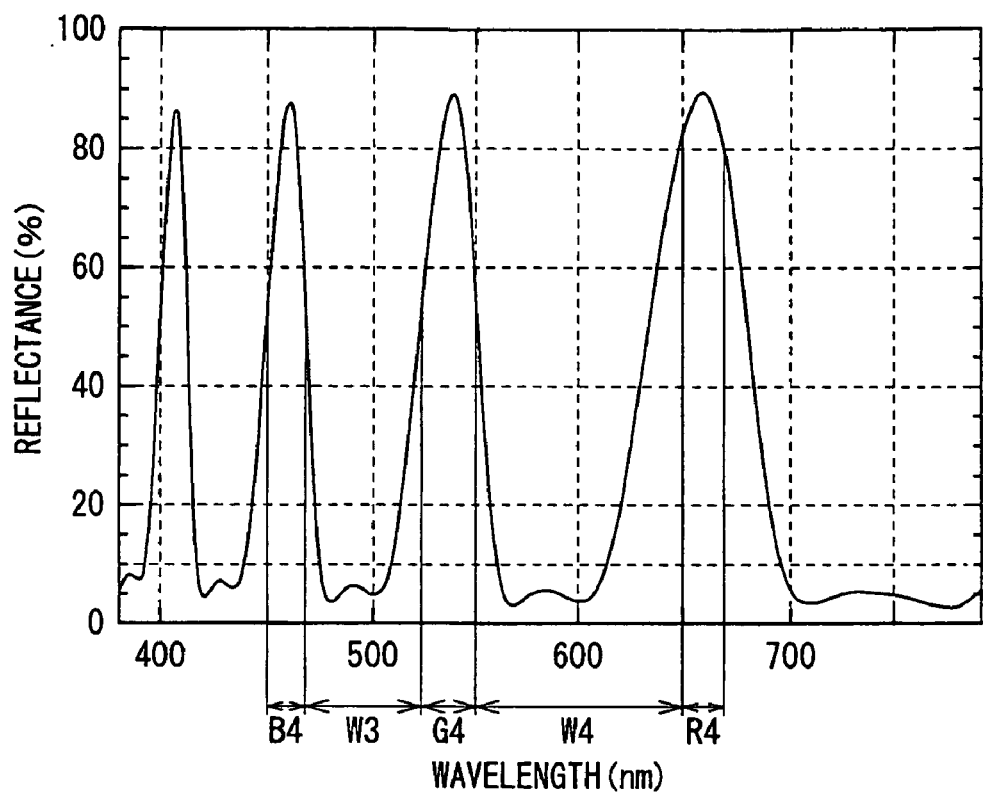
FIG. 15 is a characteristics view showing reflection characteristics of the light selective reflection filter shown in FIG. 13.

For example, as shown in FIG. 15, which will be described later, the light selective reflection filter 36 has wavelength selective reflection characteristics corresponding to spectral characteristics of the cold-cathode fluorescent lamp 43 as a light source (for example, FIG. 3). In FIG. 15, the horizontal axis represents wavelengths (nm) of incident light, and the vertical axis represents reflectance (%), and reference symbols B4, G4, and R4 represent a blue light region (460±10 nm), a green light region (535±10 nm), and a red light region (660±10 nm), respectively. As above, the light selective reflection filter 36 has a function to selectively reflect light emitted from the cold-cathode fluorescent lamp 43 (for example, three primary color regions including the red light peak R10, the green light peak G10, and the blue light peak B10 in FIG. 3) in the specific wavelength regions based on the wavelength selective reflection characteristics and to guide the reflected light to the liquid crystal panel 2. The details of the wavelength selective reflection characteristics of the light selective reflection filter 36 will be described later. By providing the light selective reflection filter 36, the color purity of illumination light can be improved. In the result, as described later, the NTSC ratio can be improved, and the color reproduction range can be expanded.

Though details will be described later, the light selective reflection filter 36 has a slope film structure whose film thickness corresponds to incident angles as the light selective reflection filter 36 is arranged on the slope K so that the incident angles of incident light emitted from the cold-cathode fluorescent lamp 43 vary according to incident positions. Thereby, variation of wavelength shift amounts when light emitted from the light source is reflected by the light selective reflection filter 36 can be inhibited.

Figure 14:
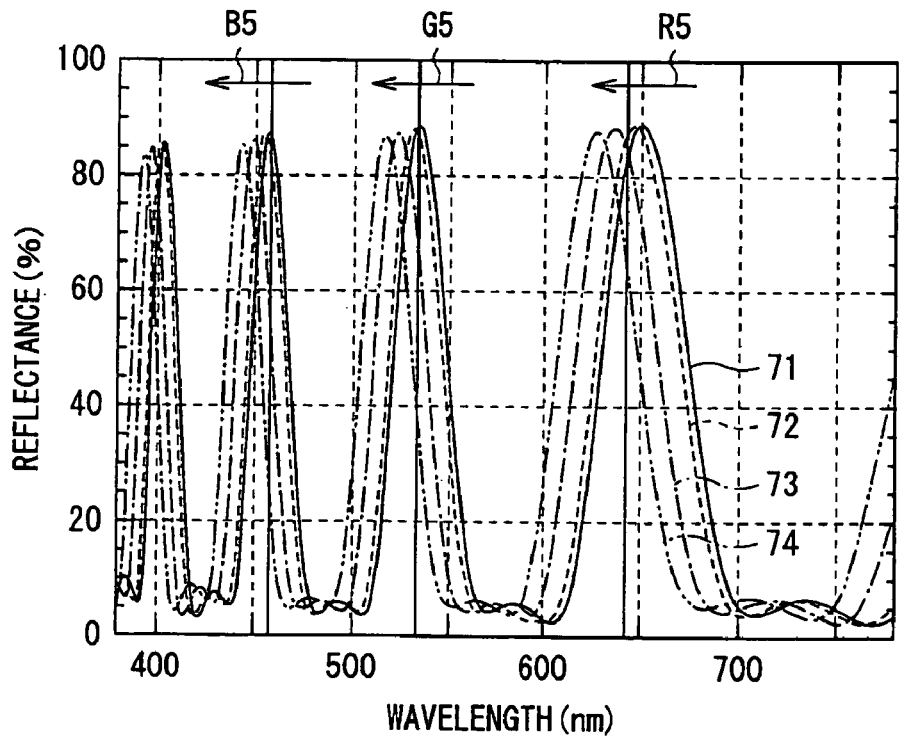
FIG. 14 is a cross section showing an example of a configuration of a light selective reflection filter shown in FIG. 13.

FIG. 14 shows a cross sectional structure of the light selective reflection filter 36 shown in FIG. 13. In the light selective reflection filter 36, a light selective reflection layer 362 is formed on a metal substrate 361. The light selective reflection layer 362 includes an optical thin film, in which metal layers 362M1 and 362M2 and dielectric layers 362D1 and 362D2 are alternately layered.

The metal substrate 361 is a section becoming a support for the light selective reflection layer 362, and is made of, for example, a metal material such as aluminum (Al).

The light selective reflection layer 362 is a section playing a core role of the light selective reflection filter 36. As described above, the light selective reflection layer 362 has a function to selectively reflect light emitted from the cold-cathode fluorescent lamp 43 in the specific wavelength regions corresponding to the wavelength selective reflection characteristics and to guide the reflected light to the liquid crystal panel 2.

As described later, the light selective reflection layer 362 can be formed by the dry process. Further, the foregoing metal layers 362M1 and 362M2 include a layer made of, for example, niobium (Nb), aluminum (Al), gold (Au), or silver (Ag). The foregoing dielectric layer 362D1 and 362D2 include, for example, a titanium oxide such as $TiO_2$, a niobium oxide such as $Nb_2O_5$, or a tantalum oxide such as $Ta_2O_5$.

Next, descriptions will be given of an example of a method of forming the light selective reflection filter 36 with such a structure. As described above, the light selective transmission filter 32 can be formed by the dry process.

First, the metal substrate 361 made of the foregoing metal material is prepared. Next, for example, by sputtering method, on the metal substrate 361, the metal layers 362M and the dielectric layers 362D made of the foregoing respective materials are alternately layered. Consequently, the light selective reflection filter 36 is formed.

The light selective reflection filter 36 formed as above is arranged between the slope K of the light guide plate 45 shown in FIG. 13, that is, the light guide plate 45 and the reflective sheet 46, thereby manufacturing the liquid crystal display 6 of this embodiment. However, as described above, when the light selective reflection filter 36 also has a function as the reflective sheet 46 and the reflective sheet 46 is not formed, the light selective reflection filter 36 may be directly formed over the whole area of the light guide plate 45.

Next, basic operations when images are displayed in the liquid crystal display 6 manufactured as above will be hereinafter described.

First, in the luminaire 4, light emitted from the cold-cathode florescent lamp 43 is reflected by the lamp reflector 44, and the reflected light is emitted to the light selective reflection filter 36. Next, among the light emitted from the luminaire 4, light in the specific wavelength regions based on the wavelength selective reflection characteristics is selectively reflected and emitted in the direction of the liquid crystal panel 2 by the light selective reflection filter 36. Next, the selectively reflected light is spread over the whole area of the liquid crystal panel 2 by the light guide plate 45, evenly diffused by the diffusion sheet 42, oriented by the prism sheet 41, and thereby emitted to the liquid crystal panel 2.

The selectively transmitted and emitted light in the luminaire 4 enters the liquid crystal panel 2, light having a light volume based on the voltage applied for every pixel between the transparent pixel electrode 27 and the transparent electrode 23 as an opposed electrode is transmitted and color-separated by using the color filter 22, and thereby color images are displayed.

Next, optical characteristics of the liquid crystal display 6 of this embodiment will be described by comparison with of the traditional liquid crystal display shown in FIG. 1.

FIG. 15 shows reflection characteristics of the light selective reflection filter 36.

As shown in the figure, the light selective reflection filter 36 shows wavelength selective reflection characteristics to selectively reflect light in the specific wavelength regions corresponding to the light source spectrum of the cold-cathode fluorescent lamp 43 (for example, three primary color regions including the red light peak R10, the green light peak G10, and the blue light peak B10 in FIG. 3). Specifically, the specific wavelength regions are, for example, the red region R4, the green region G4, and the red region R4 in the figure. The reflectance in such regions is 80% or more. The rest of the red, green and blue region has wavelength regions having reflectance of 10% or less (specifically, wavelength regions of about from 475 to 510 m and about from 560 to 615 nm) adjacent to the green region G4 (for example, from the blue region B4 to the red region R4 in the figure). Therefore, different from the transmission characteristics of a general color filter shown in FIG. 2, reflection characteristics of a narrow wavelength band are shown. Consequently, when light emitted from the cold-cathode fluorescent lamp 43 is previously filtered by using the light selective transmission filter 32 in addition to the color filter, the color purity of illumination light of the liquid crystal panel 2 can be improved. Thereby, as in the first embodiment, the NTSC ratio can be improved, and the color reproduction range can be expanded.

Figure 16:
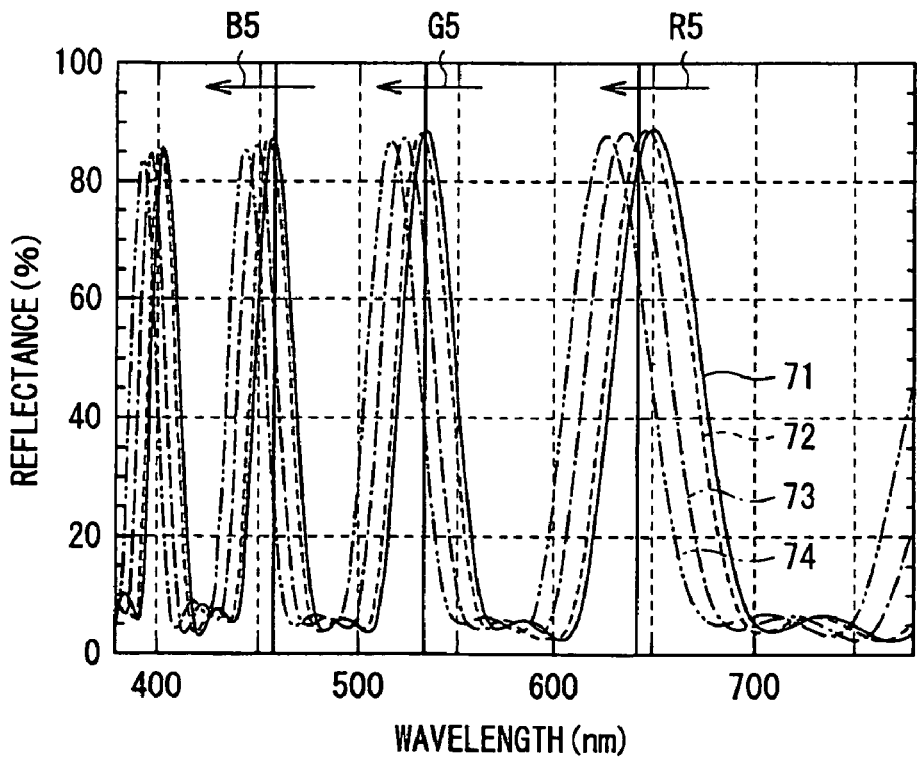
FIG. 16 is a characteristics view for explaining wavelength change when light is reflected by the light selective reflection filter shown in FIG. 13.

Further, FIG. 16 shows wavelength change when light is reflected by the light selective reflection filter 36. reference symbols 71 to 74 in the figure respectively represent reflection characteristics when the incident angles are 0°, 15°, 30°, and 40°.

As above, it was found that as the incident angle was increased from 0° to 40°, a blue light peak B5, a green light peak G5, and a red light peak R5 are shifted to the short wavelength side with the intensity unchanged, that is, it was found that when light is reflected by the light selective reflection filter 36, wavelength is changed according to incident angles.

Therefore, as described above, the light selective reflection filter 36 of this embodiment has a slope film structure whose film thickness corresponds to incident angles, considering that the light selective reflection filter 36 is arranged on the slope K so that the incident angles of incident light emitted from the cold-cathode fluorescent lamp 43 vary according to the incident positions as described above. Thereby, variation of wavelengths of reflected light according to the position where light is reflected can be inhibited, and variation of wavelength shift amounts when light emitted from the light source is reflected by the light selective reflection filter 36 can be inhibited.

As above, in this embodiment, the light selective reflection filter 36 having wavelength selective reflection characteristics corresponding to the spectral characteristics of the cold-cathode fluorescent lamp 43 as a light source is provided between the slope K of the light guide plate 45, that is, the light guide plate 45 and the reflective sheet 46. Among the light emitted from the cold-cathode fluorescent lamp 43, light in the specific wavelength regions based on the wavelength selective reflection characteristics is selectively reflected, and guided to the liquid crystal panel 2. Therefore, as in the first embodiment, by improving the color purity of illumination light of the liquid crystal panel 2, the NTSC ratio is improved and the color reproduction range can be expanded.

In particular, the light selective reflection filter 36 in which reflectance in the red region R4 (660±10 nm), the green region G4 (535±10 nm), and the blue region B4 (460±10 nm) is 80% or more, and the rest of the red, green and blue region has wavelength regions whose light reflectance is 10% or less adjacent to the green region G4 is used. Therefore, the light selective reflection filter 36 is better adapted to the cold-cathode fluorescent lamp 43 emitting light having the intensity peaks in such red region R4, green region G4, and blue region B4 (for example, the red light peak R10, the green light peak G10, and the blue light peak B10), and the color purity of illumination light can be sufficiently improved.

Further, the light selective reflection filter 36 has a slope film structure whose film thickness corresponds to incident angles of light emitted from the cold-cathode fluorescent lamp 43. Therefore, variation of wavelengths of reflected light according to the position where light is reflected can be inhibited, and variation of wavelength shift amounts when light emitted from the light source is reflected by the light selective reflection filter 36 can be inhibited. In the result, the color purity of illumination light can be further improved.

While the invention has been described with reference to the first and the second embodiments and the modifications, the invention is not limited to the foregoing embodiments and the like, and various modifications may be made.

For example, in the foregoing embodiments and the like, the case, in which the cold-cathode fluorescent lamp, which is he CCFL, is used as a light source of the luminaire has been described. However, the luminaire can be composed by using other light source such as an LED.

Further, materials, thicknesses, deposition methods, and deposition conditions of the respective layers are not limited to the materials, thicknesses, deposition methods, and deposition conditions of the respective layers, which have been described in the foregoing embodiments and the like. Other materials, thicknesses, deposition methods, and deposition conditions may be applied.

Further, in the foregoing embodiments and the like, the configurations of the liquid crystal display have been described with reference to the specific examples. However, it is not necessary to provide all layers, or it is possible to provide other layer.

Further, in the foregoing embodiments and the like, the case of the active matrix liquid crystal display has been described. However, the present invention can be applied to the case of a simple matrix driving liquid crystal display as well.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display comprising:
a liquid crystal panel driven based on image signals;
a light source emitting light for illuminating the liquid crystal panel; and
a light selective transmission filter, which has wavelength selective transmission characteristics corresponding to spectral characteristics of the light source, selectively transmits light generated from the light source in the specific wavelength regions based on the wavelength selective transmission characteristics, and guides the transmitted light to the liquid crystal panel, wherein light from the light source has respective intensity peaks at least in a red region, a green region, and a blue region, light transmittance in the red region, the green region, and the blue region of the light selective transmission filter is 80% or more, and the rest of the red, green and blue region includes wavelength regions whose light transmittance is 10% or less adjacent to the green region, wherein light transmittance of the light selective transmission filter in wavelength regions of 440±20 nm, 525±25 nm and 665±45 nm is 80% or more, and that in wavelength regions from about 470 to 485 nm and about 575 to 595 nm is 10% or less.

2. A liquid crystal display according to claim 1, wherein the light selective transmission filter has:
a substrate; and
a light selective transmission layer which is layered on the substrate.

3. A liquid crystal display according to claim 2, wherein the light selective transmission layer has a structure in which higher refractive index layers and lower refractive index layers are alternately layered, and the bottom layer and the top layer of the light selective transmission layer are the higher refractive index layers.

4. A liquid crystal display according to claim 3, wherein a film thickness distribution of the light selective transmission layer is within ±2% to a given target value.

5. A liquid crystal display according to claim 3, wherein the higher refractive index layers include a layer made of a titanium oxide, a niobium oxide, or a tantalum oxide, and the lower refractive index layers include a layer made of a silicon oxide or magnesium fluoride.

6. A liquid crystal display according to claim 3, wherein the higher refractive index layer and the lower refractive index layer are made of a thermosetting resin or a photocurable resin.

7. A liquid crystal display according to claim 2, wherein the substrate is made of a polymeric material containing polycarbonate, polyethylene telephthalate, polyethylene naphthalate, polyether sulfone, or polyolefin.

8. A liquid crystal display according to claim 1, further comprising:
a prism sheet between the light source and the liquid crystal panel, the prism sheet orienting diverged light from the light source in the direction toward the liquid crystal panel,
wherein the light selective transmission filter is provided between the prism sheet and the liquid crystal panel.

9. A liquid crystal display according to claim 1, wherein the light selective transmission filter is formed on the surface of the light source.

10. A liquid crystal display according to claim 1, wherein the light source is formed of a cold-cathode tube.

11. A liquid crystal display according to claim 1, further comprising a light guide plate which propagates light generated from the light source.

* * * * *